United States Patent
Oh et al.

(10) Patent No.: US 7,471,950 B1
(45) Date of Patent: Dec. 30, 2008

(54) BASE STATION CONTROLLED VERTICAL HANDOFF IN A HYBRID WIRELESS COMMUNICATION SYSTEM

(75) Inventors: Dae-Sik Oh, Overland Park, KS (US); Leo R. Anderson, Jr., Raymoore, MO (US); Kristin A. Hayne, Overland Park, KS (US); Tom Steele, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 124 days.

(21) Appl. No.: 11/044,764

(22) Filed: Jan. 27, 2005

(51) Int. Cl.
*H04Q 7/20* (2006.01)

(52) U.S. Cl. .................. 455/436; 455/451; 370/328

(58) Field of Classification Search .......... 455/436, 455/451; 370/328
See application file for complete search history.

(56) References Cited

U.S. PATENT DOCUMENTS

| | | | |
|---|---|---|---|
| 6,101,175 A | * | 8/2000 | Schorman et al. ........... 370/331 |
| 2004/0120283 A1 | * | 6/2004 | Rezaiifar et al. ............ 370/328 |
| 2005/0130660 A1 | * | 6/2005 | Park et al. .................... 455/436 |
| 2005/0202828 A1 | * | 9/2005 | Pecen et al. .................. 455/453 |
| 2006/0039329 A1 | * | 2/2006 | Samuel et al. ............... 370/335 |
| 2006/0104228 A1 | * | 5/2006 | Zhou et al. ................... 370/328 |

* cited by examiner

*Primary Examiner*—Duc Nguyen
*Assistant Examiner*—Eric Elcenko

(57) ABSTRACT

Base station controlled vertical handoff is disclosed. When a hybrid access terminal is operating under a first air interface protocol (e.g., IS-2000), in a mode (e.g., active) in which the terminal does not search for the presence of wireless service under a second air interface protocol (e.g., IS-856), the terminal sends a request to a base station seeking to hand off to a wireless coverage area under the protocol. The base station then determines (e.g., by reference to the PN offset specified in the request) that the target coverage area additionally provides service under the second protocol. Responsively, the base station causes the terminal to transition to a second mode (e.g., dormant) in which the terminal does search for the presence of service under the second protocol. The terminal may thereby discover the presence of service under the second protocol and may hand off to operate under the second protocol.

20 Claims, 4 Drawing Sheets ated according to a standard protocol such EIA/TIA/IS-856 Rel. 0, A, or other version thereof (hereafter "IS-856"). In such a system, a mobile station might not only hand off between coverage areas under a common air interface protocol (e.g., between IS-2000 sectors) but may also hand off between the different air interface protocols, such as between IS-2000 and IS-856. Handoff between different air interface protocols (or, more generally, between different access technologies) is known as "vertical" handoff.

BASE STATION CONTROLLED VERTICAL HANDOFF IN A HYBRID WIRELESS COMMUNICATION SYSTEM

FIELD OF THE INVENTION

The present invention relates to wireless communications and, more particularly, to vertical handoff of data communication sessions, i.e., handoff of data sessions from one air-interface protocol to another air-interface protocol. The invention is particularly useful to facilitate handoff of an active data session from an IS-2000 (e.g., 1xRTT) wireless coverage area to an IS-856 (e.g., EV-DO) wireless coverage area, but the invention may extend to other vertical handoff scenarios as well.

BACKGROUND

In a typical cellular radio communications system (wireless communication system), an area is divided geographically into a number of cell sites, each defined by a radio frequency (RF) radiation pattern from a respective base transceiver station (BTS) antenna. The base station antennae in the cells are in turn coupled to a base station controller (BSC), which is then coupled to a telecommunications switch or gateway, such as a mobile switching center (MSC) or packet data serving node (PDSN) for instance. The switch or gateway may then be coupled with a transport network, such as the PSTN or a packet-switched network (e.g., the Internet).

When a mobile station (such as a cellular telephone, pager, or appropriately equipped portable computer, for instance) is positioned in a cell, the MS communicates via an RF air interface with the BTS antenna of the cell. Consequently, a communication path is established between the mobile station and the transport network, via the air interface, the BTS, the BSC and the switch or gateway.

With the explosive growth in demand for wireless communications, the level of call traffic in most cell sites has increased drastically over recent years. To help manage the call traffic, most cells in a wireless network are usually further divided geographically into a number of sectors, each defined respectively by radiation patterns from directional antenna components of the respective BTS, or by respective BTS antennae. These sectors (which can be visualized ideally as pie pieces) can be referred to as "physical sectors," since they are physical areas of a cell site. Therefore, at any given instance, a mobile station in a wireless network will typically be positioned in a given physical sector and will be able to communicate with the transport network via the BTS serving that physical sector.

As a mobile station moves between coverage areas, such as sectors, of a wireless communication system, or when network conditions change or for other reasons, the mobile station may "hand off" from operating in one coverage area to operating in another coverage area. In a usual case, this handoff process is triggered by the mobile station monitoring the signal strength of signals that it is receiving in various available coverage areas, and the mobile station or the BSC determining when one or more threshold criteria are met. For instance, the mobile station may monitor signal strength in various available coverage areas and notify the BSC when a given coverage area has a signal strength that is sufficiently higher than the coverage area in which the mobile station is currently operating. The BSC may then direct the mobile station to hand off to that other coverage area.

In some cases, more than one air interface communication protocol might be implemented in a given market area. For instance, as will be described more below, a given market area might provide both legacy CDMA coverage under a standard protocol such as EIA/TIA/IS-2000 Rel. 0, A or other version thereof (hereafter "IS-2000") and also high data rate coverage To facilitate vertical handoff, a mobile station operating under a given air interface protocol might be arranged to periodically check for availability of service under another air interface protocol. By way of example, a mobile station operating under IS-856 might periodically check for availability of IS-2000 service. Further, when the signal strength of the available IS-2000 service is sufficiently higher than the signal strength of the existing IS-856 service, the mobile station may hand off from the IS-856 system to the IS-2000 system, typically with approval from the BSC.

SUMMARY

Unfortunately, however, in some instances, it may not be possible to trigger a vertical handoff. For example, in certain situations, a mobile station may not be arranged to check for availability of service under another air interface protocol, and so the mobile station would not discover the presence and availability of the other air interface protocol. This can occur, for instance, when a new air interface protocol is introduced in a market area where an old air interface protocol is in operation, but where the old air interface protocol does not have a provision for mobile stations to search for the presence of service provided by the new air interface protocol.

A specific example of this is a hybrid IS-2000/IS-856 system. In such a system, when a mobile station has an active IS-2000 data connection, no provision is made for the mobile station to check for the availability of IS-856 coverage. Consequently, even though IS-856 coverage may be available and may provide superior data speeds for the mobile station, the mobile station would continue to operate on the legacy IS-2000 system.

The present invention provides a mechanism to help solve this problem. The invention can apply in a scenario where at least two air interface protocols, protocol A and protocol B, exist in a given market area. Protocol A has at least two modes of operation, mode A1 and mode A2. When a mobile station operates under mode A1 of protocol A, the mobile station encounters the above-described problem of not searching for availability of protocol B service. However, when the mobile station operates under mode A2 of protocol A, the mobile station does not encounter the problem; the mobile station does search for availability of protocol B service.

In an exemplary embodiment of the invention, when a mobile station is operating under mode A1, a BSC or other radio access network entity will detect the availability of protocol B service for the mobile station and will responsively cause the mobile station to switch from operating under mode A1 to operating under mode A2. Once the mobile station switches to operate under mode A2, the mobile station will then search for availability of protocol B service and a vertical handoff from protocol A to protocol B can be triggered.

The invention can be usefully employed, for instance, to facilitate hand off of a data session from an active IS-2000 mode to an active IS-856 mode. To do so, when the mobile station is operating under IS-2000 and seeks to hand off from a first IS-2000 sector to a second IS-2000 sector, the serving BSC will determine by reference to stored data that IS-856 service is also available in the second sector. The BSC will then responsively orchestrate a vertical handoff of the mobile station from the current sector under IS-2000 to the target sector under IS-856.

In a preferred embodiment, to orchestrate the hand off from IS-2000 to IS-856, the BSC can simply direct the mobile station to transition from an IS-2000 active mode to an IS-2000 dormant mode. Once the mobile station is in the IS-2000 dormant mode, the mobile station will then conventionally perform periodic off-frequency searches and will thereby discover the presence of the IS-856 system. The mobile station will then latch onto the target sector under IS-856 and will re-acquire packet-data connectivity so as to continue the data session in which had been engaged under IS-2000.

These and other aspects, advantages, and alternatives will become more apparent to those of ordinary skill in the art by reading the following detailed description, with reference where appropriate to the accompanying drawings. Further, it should be understood that this summary and other descriptions throughout this document are intended to explain the invention by way of example only and are not intended to restrict the scope of the invention as claimed.

DETAILED DESCRIPTION

The present invention will be described by way of example with reference to hybrid IS-2000/IS-856 communications. It should be understood, however, that the invention can extend to apply in other arrangements as well.

1. CELLULAR WIRELESS PACKET DATA COMMUNICATIONS

Figure 1:
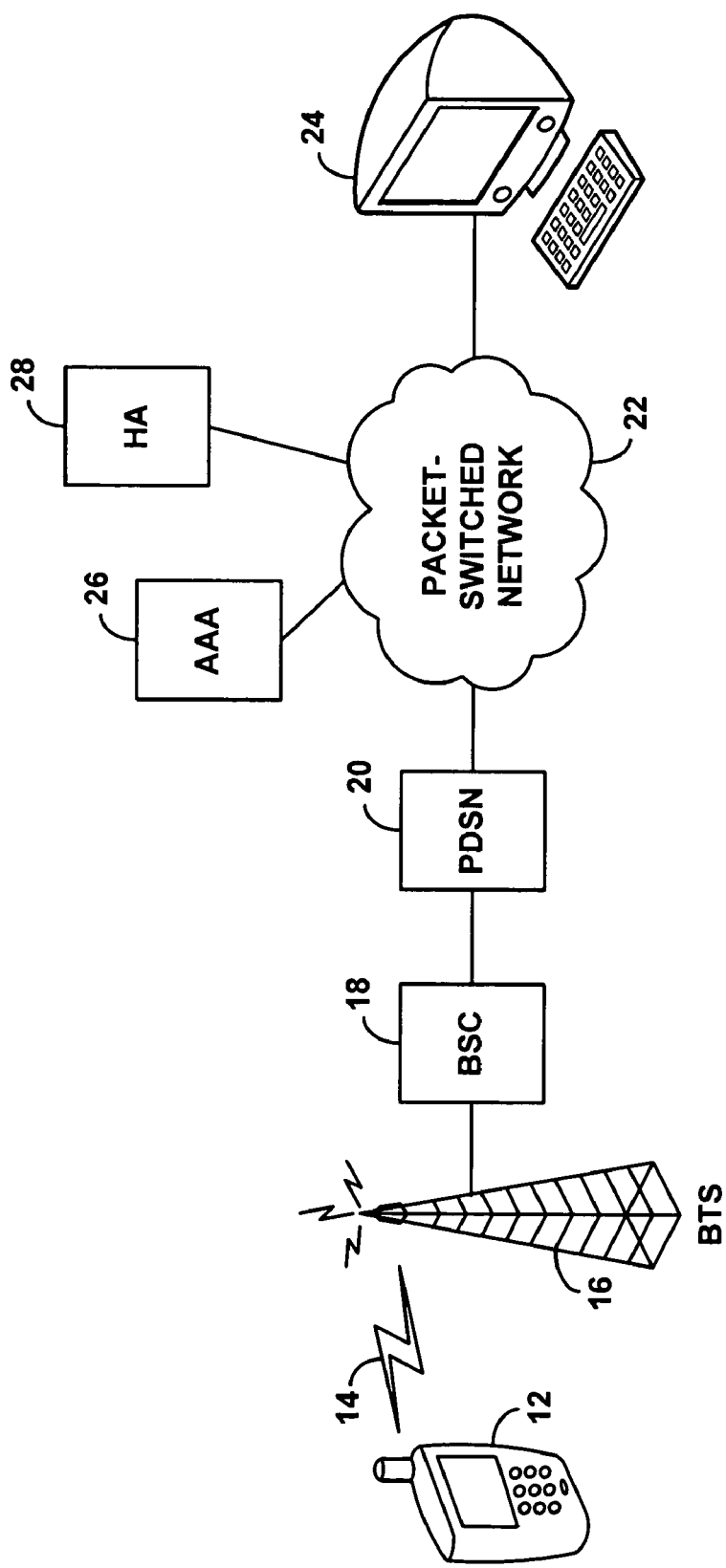
FIG. 1 is a simplified block diagram of a wireless communication system in which an exemplary embodiment of the invention can be employed.

FIG. 1 depicts an example cellular wireless communication system adapted to provide wireless packet data communication service for a mobile station 12. Mobile station 12 communicates over an air interface 14 with a BTS 16, which is then coupled or integrated with a BSC 18. BSC 18 is then coupled with a PDSN 20, which provides connectivity with a packet-switched network 22 such as the Internet and/or a wireless carrier's private core packet-network. Sitting as nodes on network 22 are, by way of example, a remote computer 24, an authentication, authorization, and accounting (AAA) server 26, and a mobile-IP home agent (HA) 28.

With this arrangement, after being authenticated by AAA server 26, HA 28 may assign an IP address for use by mobile station 12, and mobile station 12 may then engage in packet-data communications with entities such as remote computer 24, via a communication path comprising air interface 14, BTS 16, BSC 18, PDSN 20, and network 22.

Figure 2:
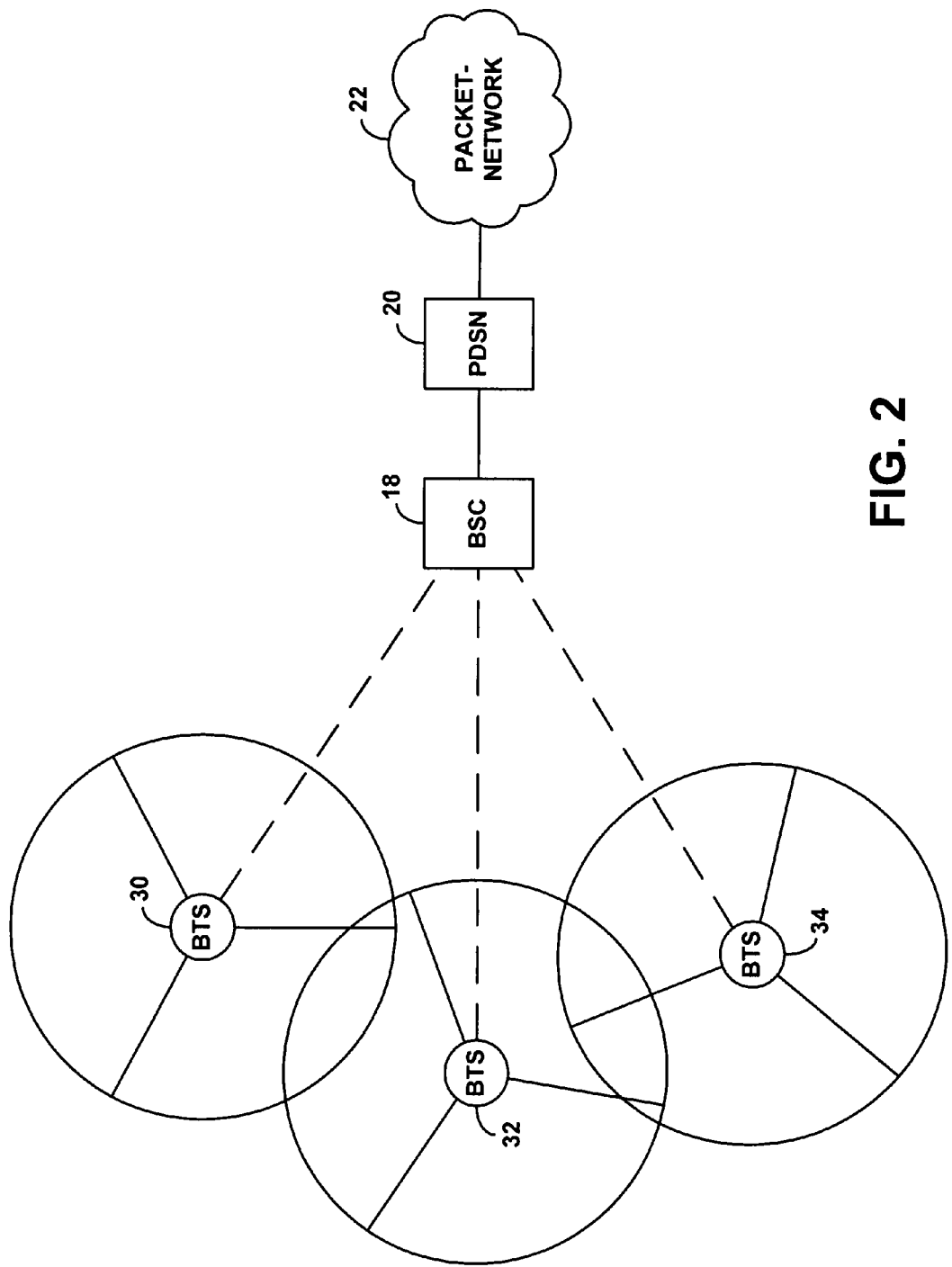
FIG. 2 is another simplified block diagram of a wireless communication system in which the exemplary embodiment can be employed.

In practice, BSC 18 may serve multiple BTSs. Each BTS may then radiate to define a given cell and a plurality of cell sectors. FIG. 2 illustrates this arrangement. As shown in FIG. 2, BSC 18 is coupled with three BTSs 30, 32, 34. Each BTS is shown at the core of a respective circle representing a cell, and each cell is divided into three pie-pieces representing sectors. With this arrangement, a mobile station can operate in any of the sectors and can communicate on packet network 22 via its serving BTS, and via BSC 18 and PDSN 20.

Throughout this description, the term "base station" will refer to a radio access network element such as a BTS, a BSC, or combination BTS/BSC, for instance. The term "radio network controller" (RNC) may also be used to refer to a BSC or more generally to a base station, usually in the context of IS-856 communications.

2. LEGACY CDMA COMMUNICATIONS

In a conventional or "legacy" Code Division Multiple Access ("CDMA") wireless network compliant with the well known IS-2000 standard, each cell employs one or more carrier frequencies, typically 1.25 MHz each, and each sector is distinguished from adjacent sectors by a pseudo-random number offset ("PN offset"). Further, each sector can concurrently communicate on multiple different channels, distinguished by "Walsh codes". When a mobile station operates in a given sector, communications between the mobile station and the BTS of the sector are carried on a given frequency and are encoded by the sector's PN offset and a given Walsh code.

Air interface communications are divided into forward link communications, which are those passing from the base station to the mobile station, and reverse link communications, which are those passing from the mobile station to the base station. In an IS-2000 system, both the forward link and reverse link communications in a given sector are encoded by the sector's PN offset and a given Walsh code. On the forward link, certain Walsh codes are reserved for use to define control channels, including a pilot channel, a sync channel, and one or more paging channels, and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

With this arrangement, a mobile station can be arranged to engage in packet-data communications. To do so, the mobile station first sends a packet-data origination request over the access channel and via the BTS 16 and BSC 18 to an MSC (not shown). The MSC then signals back to the BSC directing the BSC to assign an air interface traffic channel for use by the mobile station, and the BSC signals to the PDSN 20. The PDSN 20 and mobile station 12 then negotiate to establish a data link layer connection, such as a point to point protocol (PPP) session. Further, the PDSN 20 sends a foreign agent challenge message to the mobile station, and the mobile station responds with a mobile-IP registration request (MIP RRQ), which the PDSN forwards to HA 28. The HA then assigns an IP address for the mobile station to use, and the PDSN passes that IP address via the BSC to the mobile station.

Once the mobile station has a radio link (an assigned traffic channel), a data link, and an IP address, the mobile station is considered to be in an "active" mode. To conserve air interface resources, however, an IS-2000 system is typically arranged to release the mobile station's assigned traffic channel after a certain amount of time during which no data traffic passes to or from the mobile station through the PDSN. Upon release of the mobile station's radio link, the mobile station is considered to be in a "dormant" mode, in which it lacks a radio link but still has a data link and an IP address.

While in the dormant mode, if the mobile station seeks to transmit packet-data from its IP address, the mobile station would re-acquire a radio link by sending a new origination request message to the BSC. Similarly, if the PDSN receives packet-data destined for the IP address of a dormant mobile station, the PDSN would notify the BSC, the BSC would page the mobile station to cause the mobile station to then re-acquire a radio link, and the PDSN would then pass the data along to the mobile station.

Under IS-2000, a mobile station can communicate with a number of "active" sectors at a time. (The term "active" in this context should not be confused with the same term used to describe data communication state as noted above.) Depending on the system, the number of active sectors can be up to three or six (currently). The mobile station receives largely the same signal from each of the active sectors and, on a frame-by-frame basis, selects the best signal to use.

A mobile station maintains in its memory a list of the sectors in its "active" set. In addition, it maintains in its memory a list of "candidate" sectors (typically up to six), which are those sectors that are not yet in the active set but that have sufficient signal strength that the mobile station could demodulate signals from those sectors. Further, the mobile maintains a list of "neighbor" sectors, which are those sectors not in the active set or candidate set but are in close vicinity to the mobile station. All other possible sectors are members of a "remaining" set.

To facilitate a determination of which sectors should be in the mobile station's "active" set, all base stations emit a pilot channel signal, typically at a power level higher than other forward link signals. A mobile station then constantly measures the strength of each pilot that it receives and notifies a primary base station (a base station currently serving the mobile station) when pilot strength falls above or below designated thresholds. The base station, in turn, provides the mobile station with an updated list of active pilots.

More particularly, according to the well known EIA/TIA/IS-95 standard or EIA/TIA/IS-2000 standard, the base station initially provides the mobile station with a Handoff Direction Message (HDM), which indicates (i) the PN offsets of the sectors in the active set and (ii) the following handoff parameters that relate to pilot signal strength:

T_ADD: Threshold pilot strength for addition to the active set (e.g., −14 dB)

T_COMP: Difference in signal strength from an active set pilot (e.g., 2 dB)

T_DROP: Threshold pilot strength for removal from the active set (e.g., −16 dB)

T_TDROP: Time for which an active set pilot falls below T_DROP to justify removal from the active set (e.g., 2 seconds)

Additionally, the base station initially provides the mobile station with a Neighbor List Update Message (NLUM), which identifies the "neighbor" sectors for the current active set.

The mobile station then monitors all of the pilot signals that it receives, and the mobile station determines if any neighbor pilot exceeds T_ADD by T_COMP. If so, the mobile station adds the pilot to its "candidate" set and sends a Pilot Strength Measurement Message (PSMM) to the base station, indicating the estimated $E_c/I_o$ for the pilot. Depending on current capacity and other issues, the base station may then send an HDM to the mobile station, listing the pilot as a new member of the active set. Upon receipt of the HDM, the mobile station then adds the pilot to its active set as instructed, and the mobile station sends a Handoff Completion Message (HCM) to the base station, acknowledging the instruction, and providing a list of the pilots (PN offsets) in its active set.

Similarly, if the mobile station detects that the signal strength of a pilot in its active set drops below T_DROP, the mobile station starts a handoff drop timer. If T_TDROP passes, the mobile station then sends a PSMM to the base station, indicating the $E_c/I_o$ and drop timer. The base station may then respond by sending an HDM to the mobile station, without the pilot in the active set. The mobile station would then receive the HDM and responsively move the pilot to its neighbor set and send an HCM to the base station.

3. HIGH RATE PACKET-DATA COMMUNICATIONS

Under IS-2000, the highest rate of packet-data communications theoretically available on a fundamental traffic channel of the forward link is 9.6 kbps. In order to provide higher rate packet-data service to support higher bandwidth applications, the industry has introduced a new "high rate packet data (HRPD) system," which is defined by industry standard IS-856.

IS-856 leverages the asymmetric characteristics of most IP traffic, in which the forward link typically carries a heavier load than the reverse link. Under IS-856, the forward link uses time division multiplexing (TDM), in order to allocate all power in a sector to a given user at any moment, while the reverse link retains largely the traditional IS-2000 code division multiplexing (CDM) format, albeit with the addition of a "data rate control" (DRC) channel used to indicate the supportable data rate and best serving sector for the forward link. The end result is that a mobile station operating under IS-856 can, in theory, receive packet-data at a rate of at least 38.4 kbps and up to 2.4 Mbps.

The IS-856 forward link is divided into time slots of length 2048 chips, and each time slot is further time division multiplexed to carry various channels, including a pilot channel, a Medium Access Control (MAC) channel, and, if any traffic exists, a forward traffic channel and a "control" channel. As in IS-2000, each sector in IS-856 is defined by a PN offset, and the pilot channel carries an indication of the sector's PN offset. Also as in IS-2000, a mobile station operating under IS-856 monitors the pilot signal emitted by various sectors as a basis to facilitate active set management, i.e., to facilitate handoff from one sector to another.

IS-856 introduces a "virtual soft handoff" concept, in which a mobile station communicates with the network on just a "best" sector of its active set at any given time. As in IS-2000, the mobile station monitors the signal strength of pilot signals emitted by various sectors, and the mobile station uses threshold handoff parameters such as those noted above as a basis to trigger the addition of a sector to the mobile station's candidate set. Further as in IS-2000, the mobile station then sends a revised candidate set to the network, and the network decides whether to revise the mobile station's active set. If the network decides to update the mobile station's active set, the network sends an HDM to the mobile station and further instructs each sector to communicate with the mobile station.

Unlike IS-2000 in which forward traffic information is routed to all sectors in the mobile station's active set, forward traffic under IS-856 is routed to only a "best" sector that the mobile station selects from its active set, typically the sector that has the strongest pilot strength. In practice, the mobile station will monitor the pilot signals of the sectors in its active set, and will include in its DRC (on the reverse link) an indication of the selected serving sector. Only that sector will then serve the mobile station with forward link packets.

To acquire packet data connectivity under IS-856, after a mobile station first detects an IS-856 carrier, the mobile station sends to its BSC (or "RNC") 18 a UATI (Universal Access Terminal Identifier) request, and receives in response an International Mobile Station Identifier (IMSI), which the mobile station can then use to identify itself in subsequent communications with the BSC. The mobile station then sends a connection-request to the BSC 18, and the BSC responsively invokes a process to authenticate the mobile station and to have the mobile station acquire a data link.

In particular, the BSC 18 sends an access request to an Access Network AAA (ANAAA) server (which may be different than the AAA server 26 shown in FIG. 1), and the ANAAA server authenticates the mobile station. The BSC 18 then assigns radio resources for the data session, by directing the mobile station to operate on a particular time slot traffic channel on the forward link and a particular Walsh coded traffic channel on the reverse link. Further, the BSC signals to the PDSN 20, and the PDSN and mobile station then negotiate to establish a PPP data link. In addition, as in the IS-2000 process, the mobile station then sends an MIP RRQ to the PDSN, which the PDSN forwards to the HA 28, and the HA assigns a mobile-IP address for the mobile station to use.

As in IS-2000, once the mobile station has acquired an IS-856 radio link, a data link, and an IP address, the mobile station is considered to be in an active mode. In the active mode, the mobile station is given full use of the sector power in its assigned time slot, i.e., each time its time slot occurs, which facilitates higher rate data communication. Further, as in IS-2000, if the mobile station does not send or receive data for a defined period of time, the mobile station enters a dormant mode. In the dormant mode, an IS-856 system maintains the logical state of the mobile station's session (e.g., IP address, PPP state, and radio link session information), while releasing the mobile station's radio link resources (e.g., the time slot that had been assigned for use by the mobile station). With the maintained session state, the mobile station can quickly re-acquire a radio link so as to send or receive packet data, thereby giving the appearance that the mobile station is "always on."

4. HYBRID IS-2000/IS-856 SYSTEMS

Given the proliferation of legacy IS-2000 systems, IS-856 was designed to be backwards compatible and to facilitate "hybrid" operation. A "hybrid access terminal," in this scenario, is defined as a mobile station that can operate on both IS-2000 and IS-856 networks. A typical hybrid terminal, for instance, may be capable of receiving voice, short message service (SMS) messages, and dedicated channel data services on IS-2000 networks, as well as high-speed packet data service on IS-856 networks.

In a hybrid system, IS-2000 and IS-856 coverage are provided on different carrier frequencies, each of which is 1.25 MHz in bandwidth for consistency with legacy operation. Further, most IS-856 systems are provided as overlays on existing IS-2000 systems, such that a given BSC provides either IS-2000 coverage or both IS-2000 and IS-856 coverage. For an IS-2000 sector, the BSC may have just an IS-2000 circuit card. For a hybrid IS-2000/IS-856 sector, on the other hand, the BSC may have both an IS-2000 circuit card to facilitate IS-2000 operation and an IS-856 circuit card to facilitate IS-856 operation. A typical hybrid device will be programmed to use an IS-856 data connection when faced with the choice between IS-856 and IS-2000, i.e., when in a hybrid sector.

By standard design, when a hybrid terminal is operating in an IS-856 system, it will also periodically monitor the control channels in the IS-2000 system, in search of any incoming voice calls, SMS messages, or the like, and to monitor IS-2000 pilot signals. In the active IS-856 mode, the terminal periodically (e.g., every 5 seconds) tunes to the frequency of the IS-2000 system to monitor the IS-2000 control channels and then tunes back to the IS-856 frequency to resume the active data session. In the dormant/idle IS-856 mode, the terminal operates in a slotted manner to monitor both the IS-856 control channel and the IS-2000 control channels.

Further, because IS-856 is typically provided as an overlay on an existing IS-2000 system, it is possible that a hybrid terminal may need to hand off from a hybrid sector (providing both IS-2000 and IS-856 coverage) to an IS-2000 sector (providing no IS-856 coverage), e.g., as it moves physically out of a hybrid sector and into an IS-2000 sector. To be able to facilitate such a handoff, when a hybrid terminal is operating in IS-856 it will simultaneously maintain an IS-2000 active set (as will the IS-2000 BSC) as described above. In particular, as the terminal periodically tunes to the IS-2000 frequency, it will monitor the IS-2000 pilots, consider the various threshold parameters described above, send PSMM messages as applicable to the IS-2000 BSC, and receive HDM messages as applicable from the IS-2000 BSC. Thus, when the terminal seeks to hand off from IS-856 to IS-2000, the terminal can readily switch over to operating on one or more of the sectors currently in its IS-2000 active set.

In a hybrid system, handoff from IS-856 to IS-2000 is generally triggered by an analysis of power the C/I ratios of the available IS-856 sectors. In particular, a hybrid terminal will, as noted above, regularly monitor the C/I of available sectors. If the terminal detects that the lowest available C/I is lower than a threshold "PILOT-DROP" level (akin to the IS-2000 "TDROP" parameter), then the terminal will leave the IS-856 system and begin operating in the IS-2000 system.

If this IS-856 to IS-2000 handoff occurs when the terminal is in an idle/dormant IS-856 mode, then the terminal will simply register in the IS-2000 system and drop its IS-856 radio link. That is, the terminal may request packet data connectivity in the IS-2000 system and consequently obtain an IS-2000 radio link. Further, because the same PDSN and mobile-IP home agent likely serves both the IS-2000 and IS-856 systems, the terminal may simply maintain its existing PPP session and mobile-IP address. As one way to accomplish this in practice, when the terminal acquires an IS-2000 radio link and sends a MIP RRQ to the PDSN, the terminal can include its already-assigned mobile-IP address within the MIP RRQ. When the PDSN receives the MIP RRQ and detects that the terminal already has a mobile-IP address, the PDSN would forego sending the MIP RRQ to HA 28. Instead, the PDSN would responsively work with the IS-2000 BSC (e.g., a packet control function (PCF) of the BSC) to set up a new radio-packet (R-P) tunnel for the IS-2000 connection and would tear down the R-P tunnel that it had with the IS-856 BSC (PCF).

If the IS-856 to IS-2000 handoff occurs when the terminal is in an active IS-856 mode, on the other hand, the terminal will first switch to an IS-856 dormant mode and will then acquire dedicated packet-data connectivity in the IS-2000 system in the manner described in the preceding paragraph.

It is also possible that a hybrid terminal operating on an IS-2000 system may hand off from an IS-2000 sector to a hybrid sector. In this regard, when a hybrid terminal is in an idle/dormant IS-2000 state, the terminal will, as a standard matter, perform periodic off-frequency searches in an effort to discover existing IS-856 systems. If the terminal thereby finds an IS-856 system, it will acquire IS-856 packet-data connectivity and then operate in the IS-856 system as described above.

As noted above, however, existing industry standards do not permit a hybrid terminal that is in an active IS-2000 mode to hand off to IS-856. A reason for this is that, when a hybrid terminal is in an active IS-2000 mode, it conventionally monitors the pilots of IS-2000 sectors, but it does not perform off-frequency searches for IS-856 coverage, i.e., it does not monitor the pilots of IS-856 sectors. (This is in contrast to what happens when the hybrid terminal is in a dormant/idle IS-2000 mode.) Consequently, when a hybrid terminal that is in an active IS-2000 mode moves from an IS-2000 sector to a hybrid IS-2000/IS-856 sector, the hybrid terminal would continue to operate under IS-2000 as it hands off to the new sector. That is, the terminal would send a PSMM to the IS-2000 BSC of the hybrid sector and the IS-2000 BSC would direct the terminal to add the PN offset of the new sector into its active set. As a result, as noted above, the terminal would not benefit from the higher data rate available in the new sector.

5. BASE STATION CONTROLLED VERTICAL HANDOFF

Figure 3:
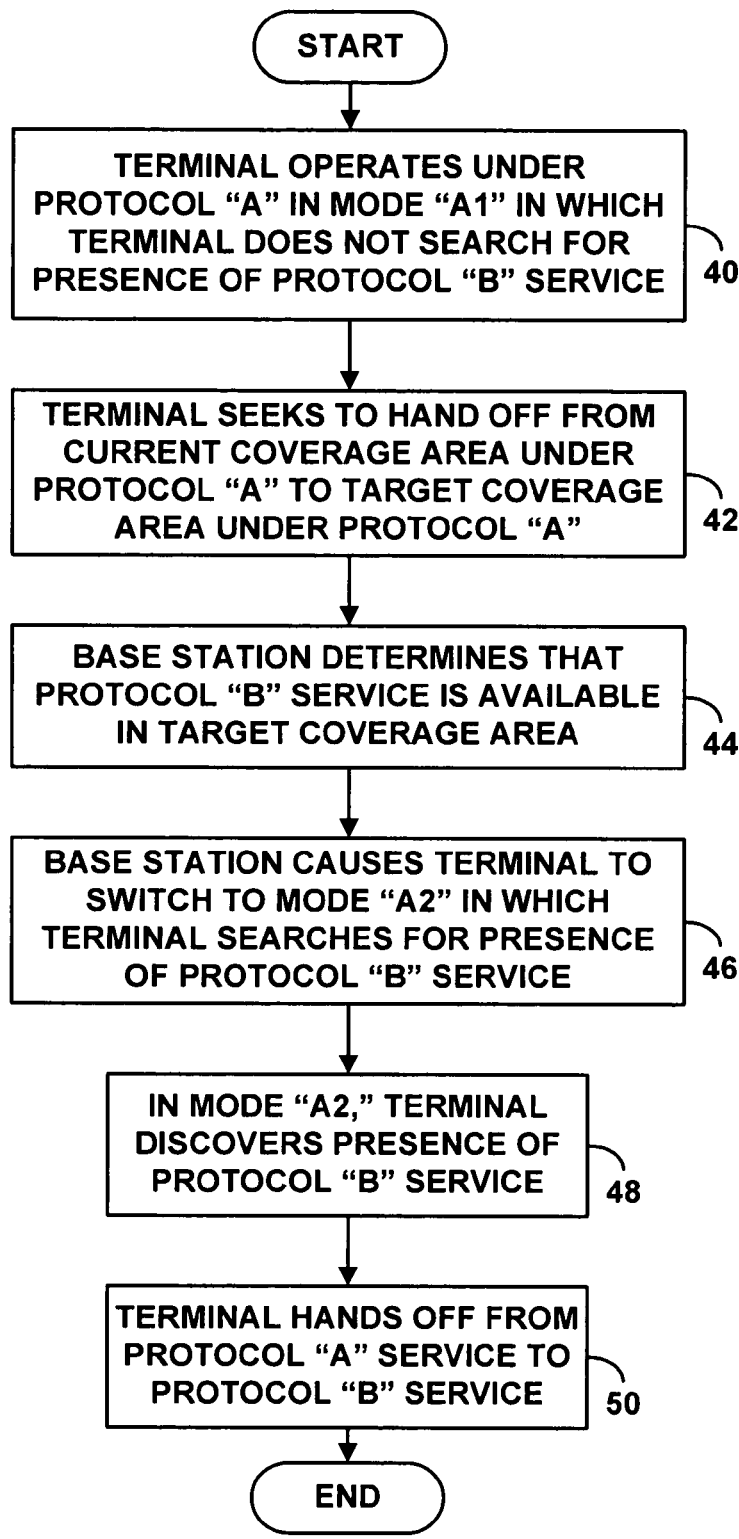
FIG. 3 is a flow chart depicting functions that can be carried out in accordance with the exemplary embodiment.

FIG. 3 is a generalized flow chart depicting operation of an exemplary embodiment of the invention. At step 40, the process begins with a hybrid terminal operating under a first air interface protocol A in a mode A1 such that the terminal unfortunately does not search for availability of service under a second air interface protocol B. At step 42, the hybrid terminal seeks to hand off (or the network seeks cause the terminal to hand off) from a current coverage area under protocol A to a target coverage area also under protocol A. When that happens, at step 44, a radio access network entity such as the serving BSC will determine that protocol B service is also available in the target coverage area. In response, at step 46, the BSC will cause the terminal to switch to mode A2 of the first air interface protocol A. At step 48, under mode A2 of protocol A, the terminal will then search for and detect the presence of protocol B service. And at step 50, handoff from protocol A service to protocol B service will occur.

In a preferred embodiment, the radio access network entity may make the determination of step 44 by simply referring to a database that lists each coverage area and indicates respectively, for each coverage area, whether the coverage area has protocol B service. The database can be maintained on the radio access network entity itself or can be located externally and queried by the entity. A network administrator can provision the database with data as protocol B service is added to or removed from various coverage areas in the market.

Applying this generalized process in a hybrid IS-2000/IS-856 system, protocol A can be IS-2000, and protocol B can be IS-856. Further, mode of operation A1 can be IS-2000 active mode, and mode of operation A2 can be IS-2000 dormant mode. As noted above, when a hybrid terminal is in IS-2000 active mode, the terminal does not search for the presence of IS-856 service, yet when the terminal is in IS-2000 dormant mode, the terminal does search for the presence of IS-856 service.

The invention can be readily applied in a hybrid IS-2000/IS-856 system where each sector in the system has the same PN offset under both IS-2000 and IS-856. Referring back to FIG. 2, for instance, assume the top sector of the top cell (produced by BTS 30) is a hybrid sector, with both IS-2000 and IS-856 service. (BSC 18 may thus have both IS-2000 logic for providing IS-2000 service in that sector and IS-856 logic for providing IS-856 service in that sector.) In a typical hybrid system, such a sector would have a given PN offset, which would be the same for the sector under both IS-2000 and IS-856.

To facilitate operation of the invention, BSC 18 can simply include or have access to a set of data that indicates, per sector in its service area, what air interface protocols are provided in the sector. Such a data set might appear as follows, for instance, where each sector is identified by a particular PN offset:

| Sector PN Offset | IS-2000 | IS-856 |
|---|---|---|
| PN 1 | Yes | No |
| PN 2 | Yes | No |
| PN 3 | Yes | No |
| PN 4 | Yes | Yes |
| PN 5 | Yes | Yes |
| PN 6 | Yes | Yes |

Figure 4:
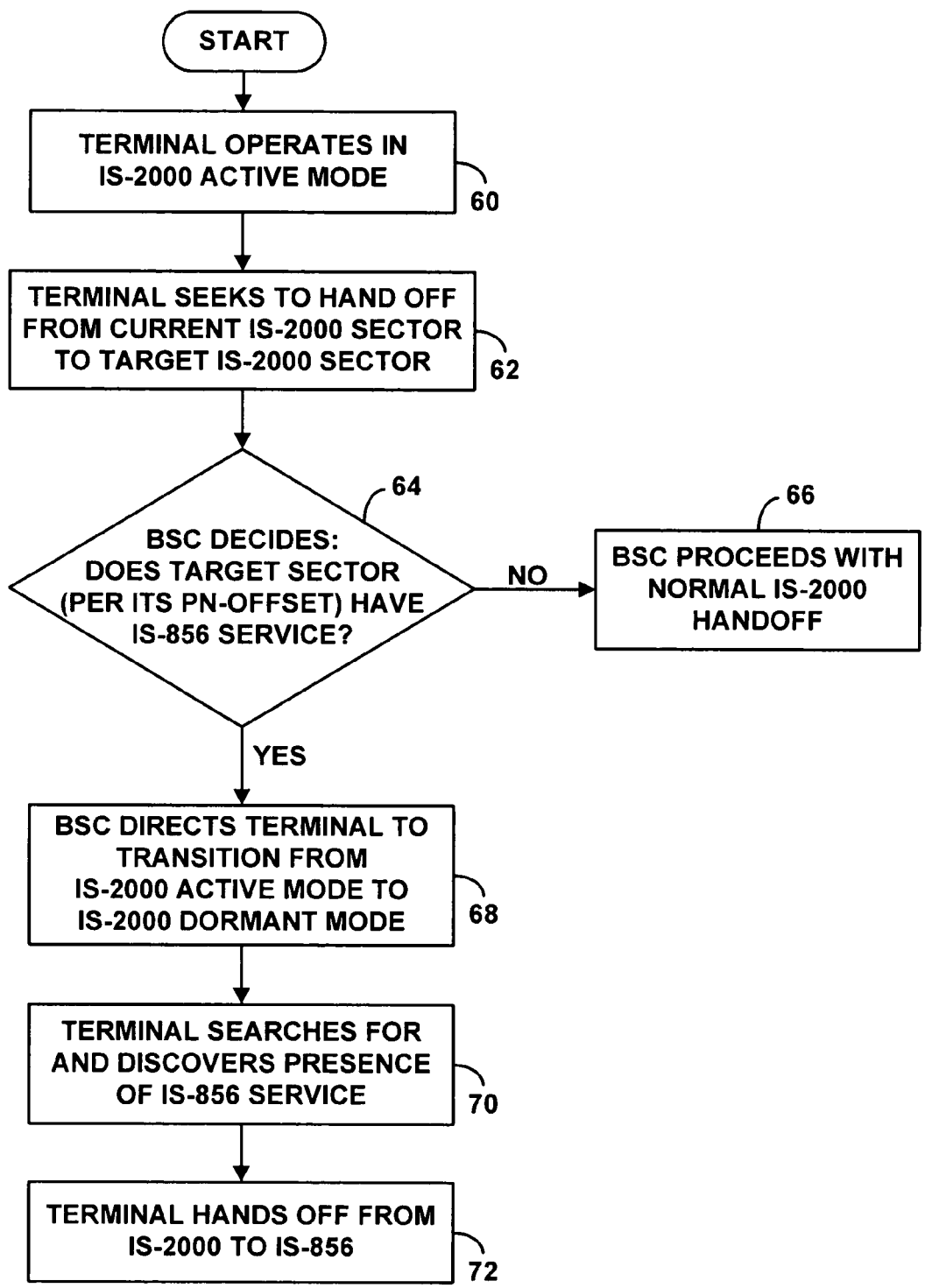
FIG. 4 is another flow chart depicting functions that can be carried out in accordance with the exemplary embodiment.

FIG. 4 provides a flow chart depicting functions that may be carried out in accordance with an exemplary embodiment of the invention, in a hybrid IS-2000/IS-856 system.

As shown in FIG. 4, at step 60, the process begins with a hybrid terminal operating under IS-2000 in an active mode in a given sector ("current sector"). That is, the hybrid terminal has a radio link, a data link, and a mobile-IP address, and can thus engage in packet-data communication over network 22. In this mode, as described above, the terminal would not search for availability of IS-856 service.

At step 62, the terminal then seeks to hand off to another sector ("target sector") also under IS-2000. For example, based on its evaluation of pilot signal strength in its current sector and in the target sector, the terminal may conclude that the target sector's pilot strength exceeds T_ADD by T_COMP. The terminal may then responsively add the PN offset of the target sector to its candidate set and send a PSMM to its serving BSC.

At step 64, the BSC will then determine whether the target sector is an IS-2000/IS-856 hybrid sector, or simply whether the target sector has IS-856 service. To do this in a preferred embodiment, the BSC will query a set of data such as the table above. Given the PN offset specified in the PSMM from the terminal, the BSC can identify a row of the table. In the row, the BSC can then determine whether the sector with that PN offset has IS-856 service.

If the BSC thereby determines that the target sector does not have IS-856 service, then, at step 66, the BSC will proceed as normal. Namely, as described above, the BSC may determine based on capacity and other issues whether to add the target sector to the terminal's active set and, if so, may send an HDM to the terminal, listing the target sector as a new member of the terminal's active set.

On the other hand, if the BSC determines that the target sector does have IS-856 service, then, at step 68, the BSC will cause the terminal to transition from its active mode to a dormant mode. To do this, the BSC may send to the terminal a ConnectionClose message, as defined by IS-2000 for instance, and the terminal may respond with a CloseReply message to acknowledge that it is in a dormant mode. As a result, the terminal will enter the IS-2000 dormant mode, in which the terminal will not have a radio link but will retain its data link and mobile-IP address.

At step 70, once the terminal is in the IS-2000 dormant mode, the terminal will then conventionally perform periodic off-frequency searches in an effort to discover existing IS-856 systems as noted above. In this case, the terminal will be likely to quickly latch onto the target sector under IS-856 and will acquire packet-data connectivity, thus effecting a hand off from IS-2000 to IS-856, at step 72. Further, in this process, the same PDSN will preferably serve both systems, so the terminal will preferably maintain its PPP state and its IP address, as in the vertical handoff scenarios described above, so the terminal can continue its data session.

It should be understood that each of the entities involved in this process can be processor-controlled, and so the functions described herein can be carried out by a processor executing machine language instructions. By way of example, the hybrid terminal can include a processor, data storage, and machine language instructions stored in the data storage and executable by the processor to carry out functions such as detecting when a handoff is desired, receiving an instruction from the BSC to transition to an IS-2000 dormant mode, and acquiring IS-856 packet data connectivity. Similarly, the BSC can include a processor, data storage, and machine language instructions stored in the data storage and executable by the processor to determine that a hybrid terminal's target sector has IS-856 service and to responsively orchestrate a vertical handoff of the terminal from IS-2000 to IS-856 as described above. Alternatively, the various functions described herein can be carried out by any combination of hardware, firmware, and/or software.

6. CONCLUSION

An exemplary embodiment of the present invention has been described above. Those skilled in the art will understand, however, that changes and modifications may be made to this embodiment without departing from the true scope and spirit of the invention, which is defined by the claims.

We claim:

1. A method comprising:
   receiving into a base station, from a mobile station, a request for the mobile station to hand off from a first wireless coverage area under a first air interface protocol to a second wireless coverage area under the first air interface protocol, at a time when the mobile station is operating in a first mode under the first air interface protocol in which the mobile station does not search for the presence of service under a second air interface protocol;
   in response to the request from the mobile station, the base station making a determination that the second wireless coverage area additionally provides service under the second air interface protocol; and
   responsive to the determination, the base station instructing the mobile station to switch to a mode of operation under the first air interface protocol in which the mobile station will search for presence of service under the second air interface protocol.

2. The method of claim 1,
   wherein receiving the request into the base station comprises receiving into the base station a message that provides an identifier of the second wireless coverage area; and
   wherein making the determination comprises referring to stored data to determine whether the second wireless coverage area having the provided identifier provides service under the second air interface protocol.

3. The method of claim 2, wherein the identifier comprises a PN-offset.

4. The method of claim 1, wherein the first air interface protocol comprises IS-2000, and wherein the second air interface protocol comprises IS-856.

5. The method of claim 4, wherein the second mode of operation comprises an IS-2000 dormant mode.

6. The method of claim 1, further comprising:
   the mobile station switching to operate under the second mode and therein discovering presence of service under the second air interface protocol; and
   the mobile station handing off from operating under the first air interface protocol to operating under the second air interface protocol.

7. In a wireless communication system in which a mobile station communicates with a radio access network according to a first air interface protocol, wherein the first air interface protocol defines (i) a first mode of operation in which the mobile station does not search for availability of wireless service under a second air interface protocol and (ii) a second mode of operation in which the mobile station searches for availability of wireless service under the second air interface protocol, a method comprising:
   receiving into the radio access network from the mobile station when the mobile station is operating in the first mode under the first air interface protocol, a request for the mobile station to hand off from a first wireless coverage area under the first air interface protocol to a second wireless coverage area under the first air interface protocol;
   at the radio access network, in response to the request from the mobile station, making a determination that the second wireless coverage area additionally provides coverage under the second air interface protocol; and
   responsive to the determination, the radio access network causing the mobile station to switch from the first mode to the second mode,
   whereby, upon switching to the second mode, the mobile station searches for availability of wireless service under the second air interface protocol.

8. The method of claim 7, wherein the first air interface protocol comprises IS-2000, and wherein the second air interface protocol comprises IS-856.

9. The method of claim 8, wherein the first mode of operation comprises an IS-2000 active mode, and wherein the second mode of operation comprises an IS-2000 dormant mode.

10. The method of claim 9, wherein causing the mobile station to switch from the first mode to the second mode comprises sending a ConnectionClose message to the mobile station.

11. The method of claim 7, wherein the request carries an identifier of the second wireless coverage area, and wherein making the determination comprises consulting stored data keyed to the identifier, to determine whether the second wireless coverage area provides coverage under the second air interface protocol.

12. The method of claim 11, wherein the identifier comprises a PN-offset.

13. A hybrid wireless communication system comprising:
   a hybrid access terminal arranged to operate according to a first air interface protocol and further arranged to operate according to a second air interface protocol, wherein the first air interface protocol defines (i) a first mode of operation in which the hybrid access terminal does not search for availability of service under the second air interface protocol and (ii) a second mode of operation in which the hybrid access terminal does search for availability of service under the second air interface protocol; and a base station arranged (i) to receive a handoff request from the hybrid access terminal while the hybrid access terminal is operating in the first mode of operation; and (ii) in response to the request from the hybrid access terminal, to detect the availability of service for the hybrid access terminal under the second air interface protocol, and to responsively cause the hybrid access terminal to switch from the first mode of operation to the second mode of operation, whereby, upon switching to the second mode of operation, the hybrid access terminal searches for and discovers availability of service under the second air interface protocol, and the hybrid access terminal engages in a vertical handoff from the first air interface protocol to the second air interface protocol.

14. The wireless communication system of claim 13, wherein the first air interface protocol comprises IS-2000, and wherein the second air interface protocol comprises IS-856.

15. The wireless communication system of claim 13, wherein the first mode of operation comprises an active mode, and wherein the second mode of operation comprises a dormant mode.

16. The wireless communication system of claim 15, wherein the base station causes the hybrid access terminal to switch to the dormant mode by sending to the hybrid access terminal a ConnectionClose message.

17. The wireless communication system of claim 13, wherein the hybrid access terminal sends to the base station a request to hand off from a first wireless coverage area under the first air interface protocol to a second wireless coverage area under the first air interface protocol, and wherein the base station detects the availability of service for the hybrid access terminal under the second air interface protocol by determining that the second wireless coverage area additionally provides service under the second air interface protocol.

18. The wireless communication system of claim 17, further comprising a set of data that specifies respectively for each of a plurality of wireless coverage areas whether the wireless coverage area provides service under the second air interface protocol, and wherein the base station consults the set of data to determine that the second wireless coverage area additionally provides service under the second air interface protocol.

19. The wireless communication system of claim 18, wherein the request carries an identifier of the second wireless coverage area, and wherein the set of data is keyed to the identifier.

20. The wireless communication system of claim 19, wherein the identifier is a PN-offset.

* * * * *